Dec. 18, 1962 B. L. GATES ET AL 3,068,780
BUNDLE TYING APPARATUS
Filed Aug. 24, 1959 3 Sheets-Sheet 1

INVENTORS
Beverly L. Gates and
Julius H. Schindorff.
BY Fishburn & Gold
ATTORNEYS.

INVENTORS
Beverly L. Gates and
Julius H. Schindorff.
ATTORNEYS.

United States Patent Office 3,068,780
Patented Dec. 18, 1962

3,068,780
BUNDLE TYING APPARATUS
Beverly L. Gates, Prairie Village, and Julius Hubert Schindorff, Lenexa, Kans. (Both of 2313 W. 43rd St., Kansas City, Kans.)
Filed Aug. 24, 1959, Ser. No. 835,549
4 Claims. (Cl. 100—4)

This invention relates to apparatus for tying a string about bundles, and more particularly to apparatus for tying a string around newspapers or the like as they are being distributed to the reader from a traveling vehicle.

Heretofore, in apparatus for tying of newspapers or the like from a moving vehicle, there has been difficulty encountered because of the jolting and jarring of the apparatus over rough streets and roads because the mechanism for tying the newspapers would be jarred and lose their position, thus interfering with efficient operation of the machine. This type of apparatus was particularly unsatisfactory where clutch mechanism was used, because the jarring would tend to engage the clutch at times when it was undesirable to have it do so.

It is, therefore, a principal object of the present invention to provide a bundle tying apparatus wherein means is provided for disengaging the clutch and holding it disengaged while the vehicle is traveling over rough streets or roads and when it is not desired to have the clutch engaged until a bundle is wrapped.

Other objects of the present invention are to provide latch mechanism for holding the clutch disengaged during the time the mechanism is in inoperative position; to provide cam means on the shaft operating the rotating means for oscillating the needle engageable with a spring urged roller against the cam means to hold the cam means in inoperative position until the clutch is released; to provide a lever mechanism engageable by the bundle to be tied whereby pressing of the lever downwardly will cause engagement of the clutch mechanism and allow the spring pressed roller arm and roller to kick off the cam mechanism to start rotation of the shaft; to provide a sprocket and chain on the shaft for operating the clutch mechanism upon kickoff of the cam on said shaft; to provide a table including a housing for parts of the mechanism upon which the bundle is placed to be tied; to provide the lever tripping means operable by placing a bundle of newspaper thereon to release the clutch mechanism and simultaneously releasing the cam member on the shaft to operate the clutch and simultaneously moving the needle arm to knot tying operation with the tying mechanism; to provide means for holding the clutch in disengagement and operation of the needle arm by crank means instead of motor operation thereof; to provide sprocket and chain connection with the shaft upon which the clutch is mounted and the gear reduction mechanism connected to the motor; and to provide a device of this character simple and economical to manufacture.

In accomplishing these and other objects of the invention we have provided improved details of structure, the preferred forms of which are shown in the accompanying drawings, wherein.

Figure 1:
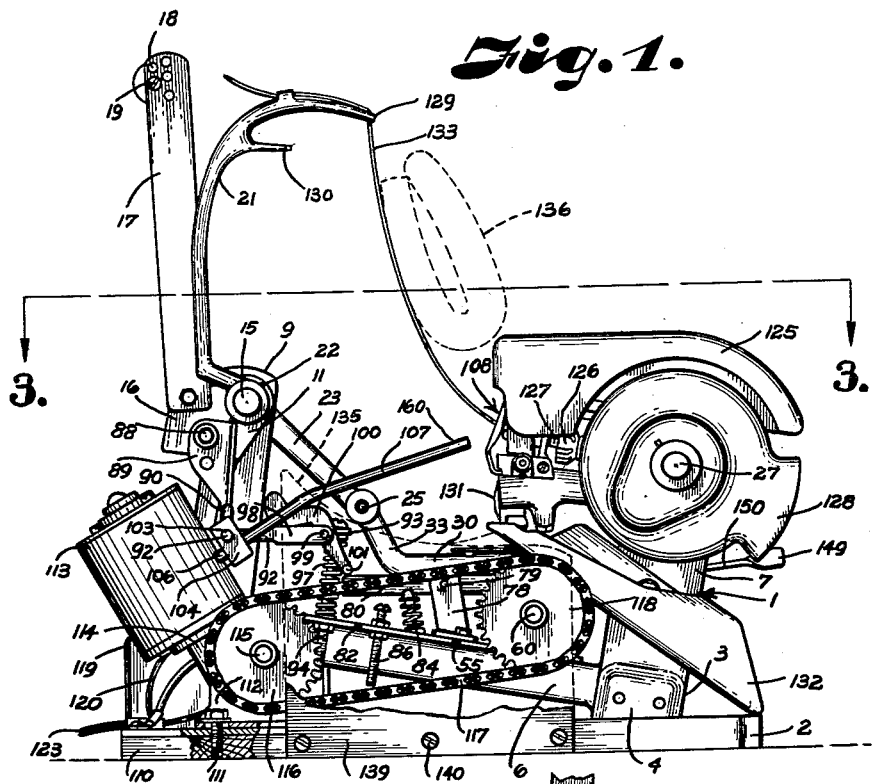
FIG. 1 is a side view of the bundle tying mechanism with the housing removed to better illustrate the invention.

Referring more in detail to the drawings:

1 designates a bundle tier embodying the features of our invention adapted to be mounted on a support 2. The device includes a frame 3 consisting of a substantially L-shaped base 4 having a rear end 5 and a side arm 6, the rear portion extending transversely of the side of the base and including spaced upwardly extending standards 7 and 8. The side arm 6 includes a vertically extending standard 9 having a transverse extension or arm 10 provided with an upwardly extending bracket 11 having an opening 12 therein aligning with an opening 13 in an upwardly extending portion 14 of the arm 9 for receiving a shaft 15 for a purpose later described.

The bracket 11 includes a flange 16 upon which is mounted an upwardly extending arm 17 having a plurality of openings 18 for receiving a pin or the like 19 for mounting a supply of twine, string or the like (not shown). A brace arm 20 is provided for the upwardly extending arm 17 to lend rigidity to the structure. The shaft 15 extends outwardly from the bearing openings in the brackets 11 and 14, and mounted on the outer end of the shaft on the side of the twine holding arm is a needle arm 21 which is rigidly secured on the shaft by a pin or the like 22. Mounted on the other end of the shaft 15 outside of the upstanding arm 9 is an arm 23 and is rigidly secured on the shaft by a pin 24, the free end of the arm having an opening 25 for receiving a pin 26 for a purpose later described.

Mounted upon the upper ends of the posts or standards 7 and 8 is a shaft 27, the shaft extending outwardly from said posts, and mounted on the outer end of the shaft near post 8 in alignment with the arm 23 is an arm 28 and rigidly secured on the shaft by a pin 29. A substantially U-shaped link member 30 has one end 31 pivotally connected to the free end of the arm 28 by a pin 32 and its other end 33 pivotally connected by the pin 26 to the arm 23 on the forward end of the frame.

Figure 3:
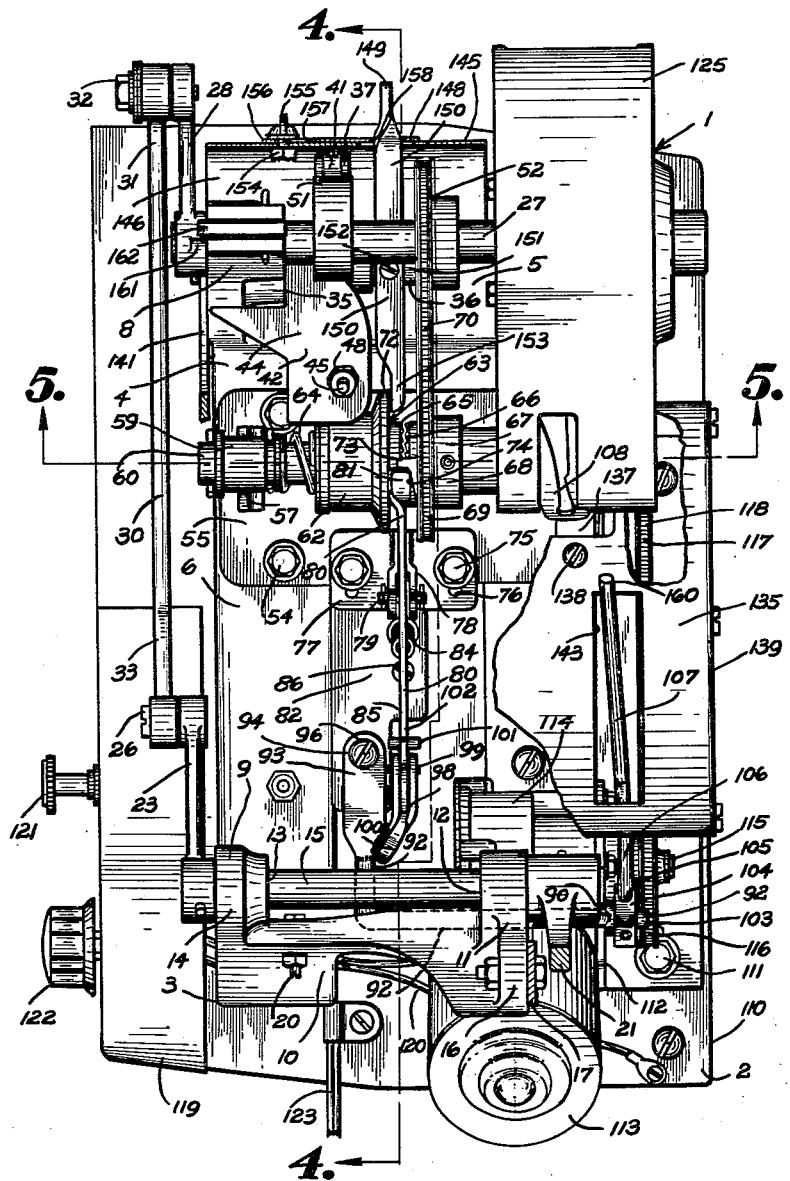
FIG. 3 is a partly cross-sectional top plan view taken on a line 3—3, FIG. 1.
Figure 4:
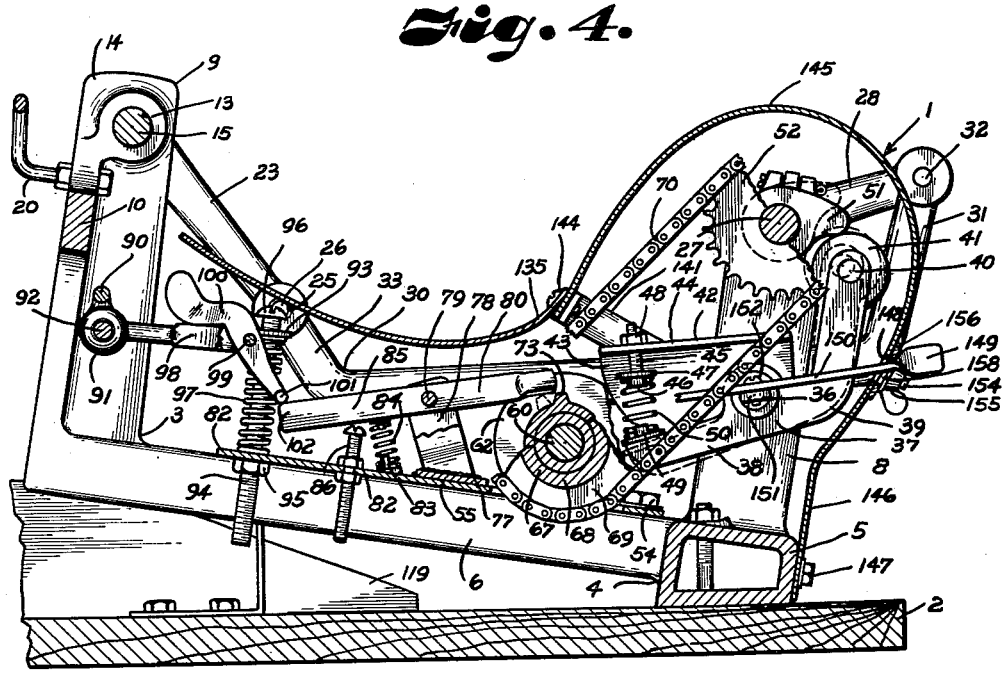
FIG. 4 is a cross-sectional view taken on a line 4—4, FIG. 3.

The upstanding standard 8 has an inwardly extending internally threaded boss 35 (FIG. 3) for receiving a rod or shaft 36 extending horizontally thereof and upon which is mounted an L-shaped arm 37 having one end 38 extending forwardly of the standard and the other end rearwardly thereof and bifurcated as indicated at 39. Mounted in said bifurcated end by a pin 40 is a roller 41. Also mounted upon the rod 36 and next to the boss 35 is a bracket member 42 having a vertical portion 43 and a transverse angle portion 44 provided with a threaded opening for receiving a threaded pin 45 having a head 46 with a spring seat 47 and a nut 48 for fastening of the pin to the portion 44. The forwardly extending portion 38 of the arm 37 is provided with a boss 49 (FIG. 4). Surrounding the boss 49 is a coil spring 50 and having its other end engaging against the spring seat 47 for exerting pressure on the arm 37, as will later be shown. Rigidly secured on the shaft 27 in alignment with the roller 41 on the arm 37 is a cam 51 for engaging the roller 41. Spaced inwardly from the cam 51 and rigidly mounted upon the shaft 27 is a sprocket 52 for a purpose later described.

Mounted upon the arm 6 of the frame by bolts or the like 54 is a transverse plate 55 having upstanding brackets 56 and 57 provided with bearings 58 and 59 for a shaft 60 upon which is slidably mounted in a keyway 61 one section 62 of a clutch 63 spring urged by a coil spring 64 surrounding the shaft 60. The section 62 of the clutch is provided with teeth 65 adapted to engage with teeth 66 on the rotating section 67 of the clutch member 63 freely rotating on the shaft 60. The rotating section 67 of the clutch includes a hub 68 and a sprocket 69 for accommodating a chain 70 which engages over the sprocket 52 mounted on the shaft 27 on the rear portion of the frame. The section 62 of the clutch includes a hub 71 and an annular flange 72 spaced from the sprocket 69. The side of the sprocket facing the flange 72 includes a lug 73 extending outwardly from the sprocket above the hub portion and has a tapered or cam surface 74 (FIG. 3) for a purpose later described.

Figure 2:
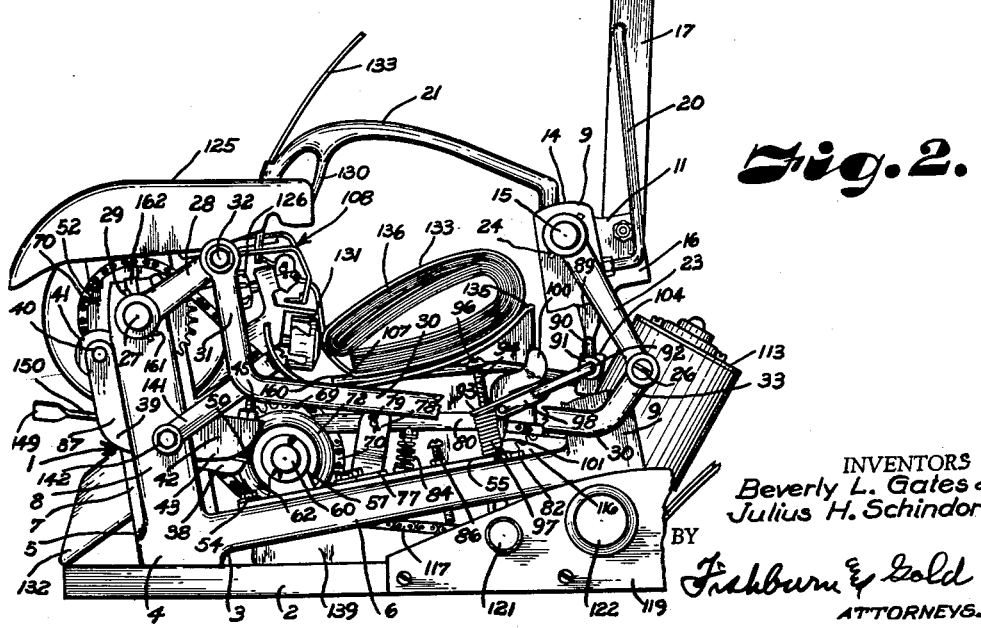
FIG. 2 is a side view of the apparatus particularly showing the bundle in position for tying on the lever tripping mechanism and the needle arm in partly operating position in connection with the tying mechanism.
Figure 5:
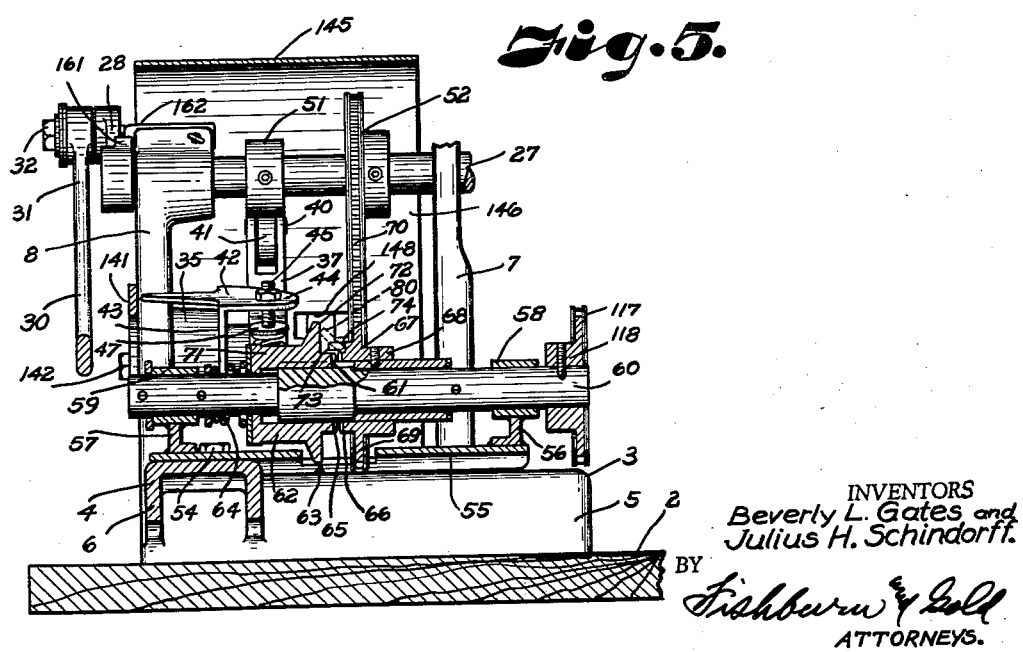
FIG. 5 is a cross-sectional view taken on a line 5—5, FIG. 3.

Adjustably mounted on the plate 55 and forwardly thereof by bolts 75 extending through openings 76 is a plate 77. The plate includes an upstanding bifurcated arm 78 having aligned openings in the upper end thereof for receiving a pin 79 for pivotally mounting a clutch bar 80. The bar 80 has one end flattened as indicated at 81 (FIG. 3) and extends between the clutch member 62 and the cam portion 74 of the clutch member 67 and is adapted to spread the clutch sections 62 and 67 apart by moving the section 62 to the left as shown in FIGS. 3 and 5, thus compressing the spring 64 and disengaging the teeth 65 and 66. In this position the forward end of the clutch bar 80 also engages the lug 73 on the section 67 (FIG. 3) to stop the sprocket 69 from rotating with the shaft 60 by drag or the like, where as the clutch section 62 rotates with the shaft due to its key connection 61 therewith. Lifting of the forward end of the clutch bar 80 will allow the clutch sections to engage with each other, thus rotating the sprocket 69, and in this position the lug 73 will pass underneath the bar 80 as shown in FIG. 4. The plate 55 includes a forwardly extending portion 82 alongside the arm 6 of the frame and rigidly mounted thereon is a short pin 83 surrounded by a coil spring 84 having its upper end engaging against the underneath side of the portion 85 of the clutch bar 80 to exert tension on the bar to keep the forward end in engagement between the clutch members 62 and 67 as shown in FIG. 3, thus disengaging the clutch. Downward movement of the portion 85 is limited by a stop pin 86 (FIG. 2).

Adjustably mounted upon the outside of the flange portion 16 of the upstanding bracket arm 11 of the transversely extending arm 10 of the post 9 by a bolt 88 is a depending bracket 89. Welded or otherwise suitably secured thereto is a rod 90 having downwardly extending ears or bearings 91 for receiving and rotatably mounting therein an L-shaped arm 92 which extends outwardly from the bearings 91, and the flattened arm portion 93 thereof extends inwardly and is provided with an opening for receiving a bolt 94 having its lower end engaging in a threaded opening in the plate portion 82 with a nut 95 thereon to rigidly secure the bolt 94 to the plate portion 82, the head 96 of the bolt being above the flattened arm 93. A coil spring 97 surrounds the bolt 94 and has one end engaging against the lower face of the arm 93 and its other end against the plate portion 82 for exerting tension on the arm 93 in an upward direction for a purpose later described.

Welded or otherwise suitably secured to the inwardly extending arm 93 is a bifurcated bracket 98, and pivotally mounted therein by a pin 99 is an L-shaped tripping arm 100 having one end extending downwardly and provided with an enlarged end 101 adapted to engage against the end 102 of the clutch bar 80. Rigidly mounted on the end 103 of the shaft 92 oppositely of the arm 93 is a block 104 having an opening 105 therein adapted to receive the end 106 of a tripping lever 107 which extends towards the tying mechanism 108 adapted to be engaged by the bundle to operate the mechanism as later shown.

Mounted on the support 2 near the end 110 thereof by bolts or the like 111 is an upstanding bracket 112 upon which is mounted on electric motor 113 connecting with a gear reduction unit (not shown) in a housing 114. The gear reduction unit includes a shaft 115 upon which is mounted a sprocket 116 for accommodating a chain 117 for engaging over a sprocket 118 rigidly mounted on the end of the shaft 60 opposite to the clutch mechanism, as best illustrated in FIG. 3. A housing 119 includes a starting and stopping switch and a motor speed regulator (not shown) having the usual connections 120 with the motor and are operated by handles 121 and 122. A cord 123 leads to a source of electric supply (not shown).

Operatively connected to the shaft 27 on the outside of the upstanding arm 7 of the frame is part of the mechanism rotatable with the shaft for operating the tying mechanism 108, the mechanism being housed within the housing 125 (FIG. 1). No invention is claimed in the tying mechanism indicated generally at 108 and may be of any general construction. We have found the tying mechanism generally shown in Patent No. 1,962,703 suitable for this purpose and includes a small gear 126 mounted upon a shaft 127 for engaging with teeth not shown but on the opposite side of a segment 128 (FIG. 1) of the mechanism which rotates with the shaft 27 for operating the actual knot tying mechanism 108 which cooperates with the needle 129 on the needle arm 21 having the usual tucking member 130. A cutter mechanism 131 is mounted adjacent the knot tying mechanism 108 and a chute 132 is located underneath the cutting mechanism for disposal of pieces of string or the like from the cutting mechanism. While the supply of string is not shown, as mentioned heretofore, 133 designates the string threaded in the needle 129 which leads to the knot typing mechanism 108.

A table housing 135 is provided for holding the bundles of paper 136 (FIG. 2). The housing is shown in dotted lines in FIG. 1 and is mounted on a bracket 137 by a screw or the like 138 having a depending skirt 139 secured to the side of the support by screws or the like 140, as illustrated in FIG. 1. The table is also supported by a bracket arm 141 mounted on the outside of the post 8 by a bolt or the like 142. The table includes an elongated slot 143 (FIG. 3) through which the tripping lever 107 extends. Also connected to the bracket 141 by a bolt 144 is a housing 145 which extends over the cam and sprocket mechanism, as best illustrated in FIG. 4. The depending skirt 146 of the housing is secured to the rear 5 of the base 4 by bolts, as indicated at 147 (FIG. 4). The housing 145 is provided with an elongated opening 148 through which the outer end 149 of a lever 150 extends. The lever has an opening about midway thereof and is mounted to the flattened end 151 of the rod 36 by a pin 152 for transverse pivotal movement. The forwardly extending end 153 of the lever 150 is reduced and extends between the flange 72 of the clutch section 62 and the sprocket 69 of the section 67 of the clutch 63, as best illustrated in FIG. 3, for a purpose later described. Mounted on the housing 145 and spaced transversely from the opening 148 is a threaded bolt 154 having a wing nut 155, and mounted for sliding transversely on the housing is a plate 156 having an elongated opening 157. The plate 156 has an opening 158 engaging over the end of the lever 150, as best illustrated in FIG. 4, also for a purpose later described.

Operation of the apparatus constructed and assembled as described when operated automatically through electrical current is as follows:

The switch handle 121 is turned to "on" position for operating the motor 113 which will rotate the shaft 115 and sprocket 116 thereon through the gear reduction unit in the housing 114. Due to the chain connection 117 the sprocket 118 rigidly mounted on shaft 60 is rotated simultaneously, thus continuously rotating the shaft 60 with the clutch section 62 thereon whereas the clutch section 67 on sprocket 69 remains stationary through the clutch bar 80 keeping the clutch section apart and also engaging against the lug 73 on section 67. The bundle 136 is placed on the upper side of the tripping lever 107, and downward pressure of the bundle on the lever will cause it to assume the position as shown in FIG. 2 so that the forward end 160 of the lever will contact the table top 135 and form a stop therefor. When the tripping lever 107 moves downwardly, the arm 93 extending substantially parallel therewith will move downwardly simultaneously against the tension of the spring 97 to cause the enlarged end 101 of the angle-shaped tripping arm 100 to engage the end 102 of the clutch bar 80 and thereby raising the forward or flattened end to disengage it from the lug 73 on the sprocket 69 and allow the clutch section to engage for rotation of the sprocket 69 and sprocket 52 on shaft 27 through chain 70 so that the lever will assume the position shown in FIG. 4. Immediately upon passage of the end of the bar 80 from the lug 73 the roller 41 on the L-shaped arm 37, due to the pressure of the coil spring 50 on the other end thereof, will push the cam 51 upwardly and give it a kickoff to start the shaft 27 to rotate therewith so that the arm 28 and link arm 30 connected to the arm 23 on the end 110 of the frame rotate the shaft 15. Raising of the end of the clutch bar 80 from the lug 73 will cause the clutch teeth 65 and 66 to engage each other to rotate the sprocket 52 on the shaft 27 to operate the knot tying mechanism, and at the same time rotation of the shaft 27 will cause the needle arm 21 to move downwardly through connection of the linkage arms 28, 30 and 23 with the shaft 15 so that the needle 129 will cooperate with the knot tying mechanism 108 to tie the knot and the cutter 131 to cut the string 133.

When the tripping lever 107 is in a complete down or tying position, as shown in FIG. 2, the tripping arm 100 of which has previously pushed down the end 102 of the clutch bar 80 to disengage the other end 81 thereof from the clutch mechanism 63 has now bypassed said end 102 (FIG. 2), thus allowing the spring 84 to force the end 81 again downwardly between the flange 72 and the sprocket 69. At this stage of the operation the end 81 of the bar 80 will merely slide over the annular surfaces of the bosses having the teeth 65 and 66 thereon until the mechanism has nearly completed one turn and one side of the flat end 81 is engaging the tapered or cam surface 74, thus starting to force the clutch sections 63 and 67 apart before the end 81 engages the lug 73 and brings the section 67 and sprocket 69 thereon to a complete stop. At this point the tying of the bundle has been completed and is removed, which will allow the spring 97 to move the tripping lever 107 upwardly into the starting position as shown in FIG. 1. The roller 41 on arm 37 has now engaged the cam 51 to exert the desired pressure on sprocket 69 over the chain 70 to hold the lug 73 firmly against the end 81 of the clutch lever 80, as shown in FIG. 3, and the apparatus is again ready to tie another bundle.

It will be obvious that the sprocket 116 on the gear reduction mechanism will continue to operate the shaft 69 upon which the clutch mechanism is mounted through the chain and sprocket connection therewith. The clutch is held in inoperative position due to the disengagement thereof through the clutch bar 80 just above described. While this clutch mechanism is disengaged the roller 41 engages the cam 51 on the shaft 27 to prevent any vibration of the apparatus, and particularly the clutch mechanism to hold the clutch inoperative.

The bundle tying apparatus as above described may be operated mechanically, if desired, by attachment of a crank handle (not shown) to the pin 32 on the arm 28. To operate the device by the crank the plate 156 is moved to the right or towards the housing 125 (FIG. 3) after loosening of the wing nut 155 to move the lever 150 as far to the right as possible so that the forward reduced end 153 thereof will engage the flange 72 of the clutch portion 62 to hold the teeth 65 out of contact with the teeth 66 during the hand operation. A shoulder 161 (FIGS. 3 and 5) is provided on the sleeve portion of the arm 28 for engaging a pivoted lug 162 mounted on top of the standard 8 to further aid in holding the mechanism stationary when not in operation.

Operation of the actual tying is the same as if it was done automatically through the motor mechanism; i.e., by contact of the bundle or paper 136 on the tripping lever 107. It will be obvious that when operating the mechanism by hand the clutch portion 67 will rotate freely on the shaft 60 by rotation of the shaft 27 through the sprocket 52 thereon rotating the sprocket 69 on the clutch through the chain 70. Holding of the clutch section 62 out of engagement of the clutch section 67 will prevent wear on the teeth of the clutch portions during operation by hand. In other words, hand operation eliminates contact of the teeth of the clutch members, whereas in the automatic operation the teeth engage during the actual tying operation.

It will be obvious from the foregoing that we have provided improved bundle tying apparatus wherein bundles may be automatically tied through sprocket and chain connection with the clutch mechanism, wherein positive action is accomplished and chattering or other interference will not interfere with the holding of the mechanism in place ready for operation when a bundle is not actually being tied.

What we claim and desire to secure by Letters Patent is:

1. In a bundle string wrapping and tying mechanism having a needle, an arm operatively connected to said needle for operating same, a shaft carrying said arm for actuating same in response to rotation of said shaft, a cam fixed on said shaft and having a lobe portion, a second shaft, a two section clutch on said second shaft with one section rotatable thereon and the other section connected therewith for rotation with said second shaft, means urging the clutch sections into driving engagement, a cam stop means on said one clutch section, a lever adapted to engage said cam stop means to hold said one clutch section against rotation with said second shaft and the clutch sections disengaged, means operatively connecting said one clutch section with said first-named shaft for rotating said first-named shaft in response to rotation of said one clutch section, trip means for operating said lever to disengage same from the cam stop when said trip means is actuated by a bundle to be tied, to permit the clutch sections to be engaged and effect rotation of the first-named shaft, and means engaging the lobe on the cam on the first-named shaft to prevent rotative retrograde movement thereof and cooperate with said lever to hold the first-named shaft and said one clutch section from movement until said lever is disengaged from the cam stop, said last named means urging said cam lobe and the first-named shaft in the direction of rotation to operate the needle whereby when the lever is disengaged from said cam stop the said last-named means initiates rotation of said first-named shaft and needle operating movement.

2. In a bundle string wrapping and tying mechanism having a needle, an arm operatively connected with said needle for operating same, a shaft carrying said arm for actuating same in response to rotation of said shaft, a cam fixed on said shaft and having a lobe portion, a second shaft, a two section clutch on said second shaft with one section rotatable thereon and the other section connected therewith for rotation with said second shaft, means urging the clutch sections into engagement, a cam stop means on said one clutch section, a lever adapted to engage said cam stop means to hold said one clutch section against rotation with said second shaft and the clutch sections disengaged, means operatively connecting said one clutch section with said first-named shaft for rotating said first-named shaft in response to rotation of said one clutch section, a trip means for operating said lever to disengage same from the cam stop when said trip means is actuated by a bundle to be tied to permit the clutch sections to be engaged and effect rotation of the first-named shaft, and a spring-biased arm engaging the lobe on the cam on the first-named shaft to prevent rotative retrograde movement thereof and cooperate with said lever to hold the first-named shaft and said one clutch section from movement until said lever is disengaged from the cam stop, said biased arm urging said cam lobe and the first-named shaft in the direction of rotation to operate the needle whereby when the lever is disengaged from said cam stop the biased arm initiates rotation of said first-named shaft and needle operating movement.

3. In a bundle string wrapping and tying mechanism having a needle, an arm for operating the needle, a second arm connected to the first-named arm by a link for moving the first-named arm and the needle, a shaft connected to said second arm for actuating same in response to rotation of said shaft, a cam fixed on said shaft and having a lobe portion, a second shaft, a two section clutch on said second shaft with one section rotatable thereon and the other section connected therewith for rotation with said second shaft, said clutch sections each having teeth facing the other section, means urging one of the clutch sections longitudinally of said second shaft to effect engagement of said teeth to drive said other clutch section, a cam stop means on said one clutch section, a lever adapted to engage said cam stop means to hold said one clutch section against rotation with said second shaft and the clutch sections disengaged, means operatively connecting said one clutch section with said first-named shaft for rotating said first-named shaft in response to rotation of said one clutch section, a trip means for operating said lever to disengage same from the cam stop when said trip means is actuated by a bundle to be tied to permit the clutch sections to be engaged and effect rotation of the first-named shaft, and a spring-biased arm engaging the lobe on the cam on the first-named shaft to prevent rotative retrograde movement thereof and cooperate with said lever to hold the first-named shaft and said one clutch section from movement until said lever is disengaged from the cam stop, said biased arm urging said cam lobe and the first-named shaft in the direction of rotation to operate the needle whereby when the lever is disengaged from said cam stop the biased arm initiates rotation of said first-named shaft and needle operating movement of the first and second arms and link.

4. In a bundle string wrapping and tying mechanism having a frame, a needle movably mounted on the frame, an arm for operating the needle, a second arm connected to the first-named arm by a link for moving the first-named arm and the needle, a shaft rotatably mounted on the frame in spaced relation to the needle, said second arm being fixed to said shaft and actuated in response to rotation of said shaft, a cam fixed on said shaft and having a lobe portion, a second shaft rotatable on the frame and spaced from the first-named shaft, a two section clutch on said second shaft with one section rotatable thereon and the other section connected therewith for rotation with said second shaft, means urging one of the clutch sections longitudinally of said second shaft for effecting driving engagement of said sections, a cam stop means on said one clutch section, a lever pivotally mounted on the frame and adapted to engage said cam stop means to disengage said clutch sections and to hold said one clutch section against rotation with said second shaft, means biasing said lever into engagement with said cam stop, means including a sprocket fixed to said one clutch section and a sprocket fixed to said first-named shaft for operatively connecting said one clutch section and the first-named shaft for driving said first-named shaft in response to rotation of said one clutch section, a trip means in position to be engaged by a bundle to be tied and adapted to engage said lever for operating said lever to disengage same from the cam stop when said trip means is actuated by a bundle to be tied to permit the clutch sections to be engaged and effect rotation of the first-named shaft, a spring-biased arm pivoted on the frame and having an end adjacent the lobe on the cam on the first-named shaft, and a roller on said arm end engaging the lobe on the cam on the first-named shaft to prevent rotative retrograde movement thereof and cooperate with said lever to hold the first-named shaft and said one clutch section from any rotative movement until said lever is disengaged from the cam stop, said biased arm and roller thereon urging said cam lobe and the first-named shaft in the direction of rotation to operate the needle whereby when the lever is disengaged from said cam stop the biased arm initiates rotation of said first-named shaft and needle operating movement of the first and second arms and link.

References Cited in the file of this patent

UNITED STATES PATENTS

| 1,105,703 | Saxton et al. | Aug. 4, 1914 |
| 2,224,192 | Madsen | Dec. 10, 1940 |
| 2,265,134 | Gollwitzer | Dec. 9, 1941 |
| 2,346,786 | Radeck | Apr. 18, 1944 |
| 2,425,076 | Young | Aug. 5, 1947 |
| 2,711,237 | Wylie | June 21, 1955 |